United States Patent

[11] 3,622,348

[72] Inventor Denis J. Malin
 Columbus, Ohio
[21] Appl. No. 842,260
[22] Filed July 16, 1969
[45] Patented Nov. 23, 1971
[73] Assignee Arthur Treacher's Fish & Chips, Inc.
 Columbus, Ohio

[54] FISH PREPARATION METHOD
 2 Claims, 1 Drawing Fig.
[52] U.S. Cl. .................................................. 99/111,
 99/107, 99/194, 99/195
[51] Int. Cl. ....................................................... A22c 25/00
[50] Field of Search ........................................... 99/107,
 111, 194, 195

[56] References Cited
 UNITED STATES PATENTS
2,716,608 8/1955 Renish .................... 99/194
2,724,651 11/1955 Hampton et al. ......... 99/195
3,034,906 5/1962 Williams .................. 99/195

Primary Examiner—Hyman Lord
Attorneys—Frank H. Foster and Jerome R. Cox

ABSTRACT: Uncooked fish, initially frozen below 0° F. is stored for at least 8 hours in an unopened refrigerator which is maintained at approximately 25° F. and the temperature of the fish is thus raised to 25° F. When the fish temperature becomes approximately uniformly 25° F., the fish attains an intermediate consistency which is characterized by the fish having neither the soft fleshy consistency of completely thawed fish nor the solid hard consistency of completely frozen fish. While at this intermediate consistency, the fish may conveniently be and is cut into serving portions, dipped in a saline solution, coated with granulated rice, and then coated with a batter, all without loss of flavor. With the fish still remaining substantially at approximately 25° F., it is inserted in a hot cooking oil for deep frying and permitted to sink in the oil. The fish will rise and float in the cooking oil after it has been properly cooked. It therefore is removed from the cooking oil substantially immediately after it rises and floats.

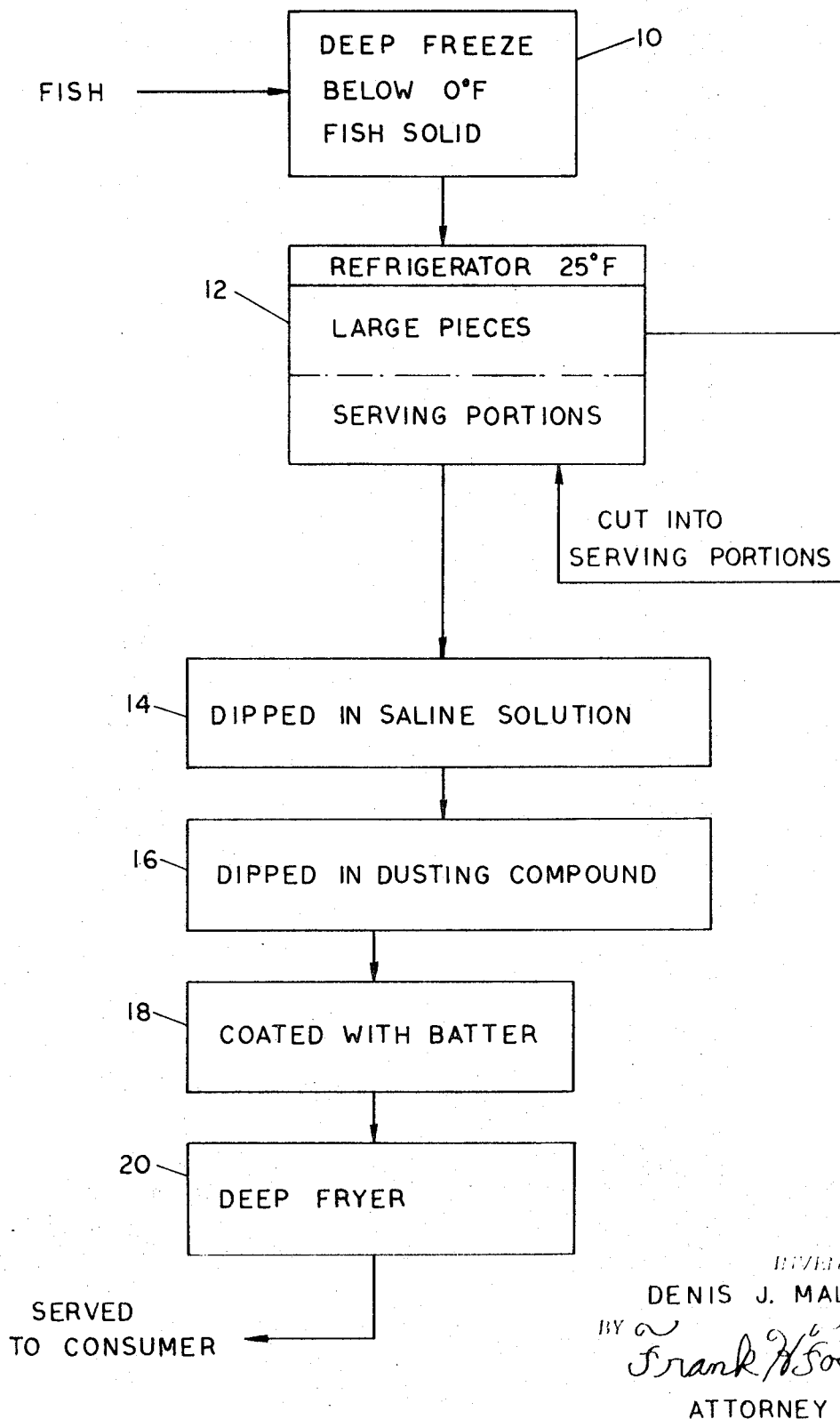

FISH PREPARATION METHOD

BACKGROUND OF THE INVENTION

The invention relates to a process to be used in preparing an initially frozen food for consumption, and more particularly relates to a process for preparing and deep frying frozen fish while avoiding the loss of flavor often coincident to volume production.

The traditional British dish known as "Fish & Chips" has long been one of the most pleasing and enjoyable foods available in the world. In recent years, its popularity has greatly increased, especially across the United States. To meet this growing demand for quality "fish and chips," and at the same time to meet the traditional American demand for fast, convenient service, it is necessary to provide a large number of relatively small restaurant and carryout installations at many convenient locations across the country. The supply of fish having maximum quality, freshness, and appeal to these many installations requires that bulk fish be maintained frozen below 0° F. when being shipped and warehoused.

In order to efficiently operate these many restaurant and carryout installations in a business like manner, the preparation of this fish for consumption by customers will be done by persons who do not have extensive training. It is desirable that relatively untrained and unskilled people be able to prepare a high standard quality fish product.

There are, of course, many recipes for the preparation of fish. The manufacturers of frozen fish, such as those available in retail grocery stores, usually recommend for deep frying the traditional instruction that the fish be inserted in hot cooking oil while in a frozen solid condition. The reason is that fish deteriorate very rapidly when thawed. It deteriorates because the natural juices in the fish, which provide the taste and flavor, will begin to drain away after thawing. If the fish is left too long in a thawed condition it will further deteriorate and acquire an objectionable "fishy" taste and smell.

Traditionally in Great Britain, fresh, unfrozen fish are available and are inserted in the cooking oil while the fish temperature is above 32° F. When frozen fish are used (i.e. if fresh fish is unavailable) it is common to cook the fish in the cooking oil after the fish has been completely thawed. For both of these traditional methods of preparing the fish, the person doing the actual cooking must have considerable knowledge and experience in the cooking of the fish for fish and chips. He must be able to exercise his skill in determining when each piece of fish has been cooked the proper length of time so that it will have maximum taste appeal. The cooking time will vary with oil temperature and with the size of each portion. Persons having such knowledge and skill are not readily available, especially in the United States. There is, therefore, a need for a method for preparing quality fish, which method can be practiced by persons inexperienced in the preparation of fish and chips.

The handling of unfrozen fish by inexperienced people makes the flavor loss or spoilage problem even more critical. The prevalent practice in commercial production of cooked fish in the United States is to thaw the fish and them dip and coat it with batter. However, I have found that once the fish thaws to the point where juices can flow from it, the fish rapidly suffers a great loss of flavor and continues to do so. There is therefore a need for a process for preparing fish which will permit volume preparation of deep-fried fish without significant loss of flavor.

It is therefore an object of the invention to provide an improved food preparation method.

A further object of the invention is to provide a method of preparing fish for consumption so that the fish has a maximum appeal to most tastes.

A further object of the invention is to provide a fish product which is cooked to uniform perfection regardless of the lack of skill of the operator or the variation in the size of the portions being cooked.

A further object of the invention is to provide a method for preparing fish for consumption, which method may be efficiently practiced by a small, high-volume restaurant.

Further objects and features of the invention will be apparent from the following specification and claims when considered in connection with the accompanying drawing illustrating the invention.

SUMMARY OF THE INVENTION

I have found that the foregoing and other objects may be attained in a process wherein initially hard frozen food is first raised to a temperature range of 20°–32° F. at which the food acquires an intermediate consistency. At an intermediate consistency, it is neither frozen solid nor soft and fleshy. It has a quality of stiffness but can be manipulated and cut with a knife. The food is then coated with a batter and inserted in hot cooking oil while it is substantially at the intermediate consistency. The food is permitted to sink and will remain submerged until it has been properly cooked. After the proper cooking, it will rise and float in the oil and should be substantially immediately removed therefrom.

The FIGURE is a block diagram illustrating the steps of an embodiment of the invention.

In describing the preferred embodiment of the invention illustrated in the drawing, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

In the FIGURE, I illustrate the steps which I prefer to perform in preparing fish for service to a consumer. Normally, initially hard frozen bulk-size fish will be shipped in a frozen solid condition to a restaurant installation. When the fish is received, it will be stored in a deepfreeze 10 which will be kept below 0° F.

Each evening, after a day of operation and prior to the next day's operation, a sufficient quantity of bulk-size fish for one day's operation will be removed from the deepfreeze 10 and stored in a refrigerator 12. I prefer to keep the refrigerator 12 at approximately 25° F. If the refrigerator is being opened very often, a lower temperature may be necessary or if not often being opened a higher temperature may be used. The temperature should, however, be in the range between 20° and 32° F. If the door remains unopened, the storage period should be at least approximately 8 hours. If the door is constantly being opened a 4 hour period would be suitable.

The following morning, after the large bulk pieces of fish have had their temperature raised to approximately uniformly 25° F., they are removed from the refrigerator 12 and are cut into serving portions. The size of the portions will vary somewhat according to the desires of the manager and the accuracy of the person cutting them. Usually they should be approximately 2 to 4 ounces although I prefer 2 oz. portions. The cut-up portions are then immediately returned to the refrigerator 12 for withdrawal as they are needed for cooking.

The purpose of the refrigerator 12 is to bring the temperature of the frozen fish to a temperature at which the fish acquires a uniformly intermediate consistency. At a temperature range around 25° F., the frozen fish will neither be frozen solid nor will it have the soft fleshy consistency of thawed fish. It will have some stiffness and yet it will have a consistency which is very convenient for cutting the bulk size fish into serving portions. This intermediate consistency is not only important for the physical manipulation of the fish but, as will be seen, has a significant effect upon the cooking of the fish. However, the fish could, it desired, be sawed into serving portions while they are frozen solid without injuring their flavor.

As fish is ordered throughout the day by consumers, the serving portions are withdrawn from the refrigerator 12, dipped into a saline solution 14 for a few seconds, and then dipped in and coated with a dusting compound 16. The saline solution cleanses the surface of the fish, removes any ice particles which would otherwise burst the batter, adds flavor, and provides a suitably damp surface to aid the adherence of the dusting compound. The dusting compound 16 which I prefer is rice cones or granulated rice. The dusting compound 16 serves to absorb the surface dampness of the fish and gives the fish a uniform, dry, outer surface which helps seal the moisture in the fish. The dusting compound also aids the adherence of the batter to the fish, helps the fish retain its crispness and inhibits heat loss from the fish. After being coated with the dusting compound, the fish is dipped in a batter 18 and coated with a relatively thick layer of batter to aid the moisture retention of the fish. After being dipped and coated with the batter, the fish is ready to be inserted in a hot cooking oil. It is important that during all these steps, the fish remains substantially at the intermediate consistency and therefore remains substantially in the temperature range of 20° to 32° F. By keeping the fish in this temperature range flavor loss is substantially prevented and still cutting and manipulation through the coatings can be accomplished.

I prefer to insert the fish in an oil having a temperature of 362° F. Although a different temperature might slightly alter the cooking time and result, the temperature is not critical I have found that regardless of the specific size of the serving portion, which may be any size in the approximate range of from 1 to 6 ounces, it will remain submerged in the hot cooking oil until it has been cooked the proper length of time. Only after it has been cooked so that it has the most desirable and commercially saleable taste, will it rise to the top and float in the oil. Smaller serving portions will rise earlier, and the larger portions will remain submerged for a longer period of time. However, I have found that all portions, regardless of when they rise, will be cooked to provide a uniform product which is cooked to perfection.

Although this discovery would be of importance, even to those skilled in the cooking of fish, it is far more important in the volume production of high quality, uniform, fish and chips. A high degree of culinary skill is unnecessary in order to be able to withdraw serving portions from the refrigerator 12, dip them in the saline solution 14, dip them in the dusting compound 16, coat them with batter 18, drop them in the deep fryer 20, take them from the cooking oil when they rise to the top, and serve them to the consumers.

Thus, I have found it both commercially and gastronomically desirable to ignore the two traditional methods of deep frying fish referred to above. I do not insert the fish in oil while it is frozen solid because I have found it will rise without being adequately cooked in the center. I do not insert the fish in the oil when it is thawed because if it is allowed to thaw the flavor will be lost. Rather I utilize the peculiar qualities and advantages which I have discovered are available by using the fish while it is of an intermediate uniform consistency between these two stages. By doing this, I obtain improved quality, improved uniformity, and improved ease of preparation.

It is to be understood that while the detailed drawings and specific examples given describe preferred embodiments of my invention, they are for purposes of illustration only; that the process of the invention is not limited to the precise details and conditions disclosed; and that various changes may be made therein without departing from the spirit of the invention which is defined by the following claims.

I claim:

1. A process to be used in preparing initially hard frozen fish serving portions for consumption, comprising the steps of:
    a. effecting the temperature rise of the frozen fish portions to a temperature substantially within the range of 20° to 32° F. at which the fish portions have an intermediate consistency
    b. dipping serving portions of said fish in a saline solution while substantially at said temperature;
    c. coating the portions with granulated rice while substantially at said temperature;
    d. coating the portions with batter while substantially at said temperature;
    e. inserting the fish portions in a hot cooking oil while substantially at said temperature and permitting it to sink in the oil; and
    f. removing the fish portions from the cooking oil substantially immediately after it rises and floats in the oil.

2. A process according to claim 1, wherein said temperature is substantially 25° F.

* * * * *